United States Patent [19]
Adamson

[11] Patent Number: 5,385,358
[45] Date of Patent: Jan. 31, 1995

[54] SHOPPING CART HAVING BASKET WITH IMPROVED FRONT GATE

[75] Inventor: Mark Adamson, Broken Arrow, Okla.

[73] Assignee: UNR Industries, Inc., Chicago, Ill.

[21] Appl. No.: 58,566

[22] Filed: May 6, 1993

[51] Int. Cl.$^6$ ................................................ B62B 3/02
[52] U.S. Cl. ............................ 280/33.995; 280/47.35; 280/79.3
[58] Field of Search .................. 280/33.991, 33.995, 280/33.996, 47.35, 79.3

[56] References Cited

U.S. PATENT DOCUMENTS

| | | | |
|---|---|---|---|
| 3,036,722 | 5/1962 | Sharaway | 280/33.995 X |
| 3,052,484 | 9/1962 | Huffman et al. | 280/47.35 |
| 3,115,975 | 12/1963 | Thompson | 280/33.995 X |
| 3,297,108 | 1/1967 | Davis | 280/33.995 |
| 3,361,438 | 1/1968 | Davis | 280/33.991 |
| 3,375,018 | 3/1968 | Close | 280/33.991 |
| 3,534,973 | 10/1970 | Elliott | 280/47.35 |
| 3,815,932 | 6/1974 | Ruger | 280/33.995 |
| 3,953,044 | 4/1976 | Wilson | 280/79.3 X |
| 4,007,809 | 2/1977 | Goransson | 280/33.995 X |
| 4,116,456 | 9/1978 | Stover et al. | 280/33.995 |
| 4,118,044 | 10/1978 | Celms | 2809/33.995 |
| 4,353,564 | 10/1982 | Joseloff | 280/47.35 X |
| 4,560,180 | 12/1985 | Ulmer | 280/33.995 |
| 5,074,570 | 12/1991 | Ferris et al. | 280/33.995 |

FOREIGN PATENT DOCUMENTS 2676417 11/1992 France ............................ 280/33.995
1429027 3/1976 United Kingdom ........... 280/33.995

OTHER PUBLICATIONS 2-page Brochure, "Unarco CHECKMATE ® 500 Series and 600 Series Over-the-Counter Carts 1500 and 1600 Series", Counter Level Carts, Oct. 1986.

*Primary Examiner*—Kenneth R. Rice
*Assistant Examiner*—Carla Mattix
*Attorney, Agent, or Firm*—Dressler, Goldsmith, Shore & Milnamow, Ltd.

[57] ABSTRACT

A front gate for a shopping cart basket comprises two stanchions, each formed from a wire fixed to the front edge of a side panel of the basket, and a gate panel including horizontal wires defining upper hinge pintles and lower latch pintles. The wires forming the stanchions are bent to define vertical slots having front openings and permitting vertical movement of the gate panel between a lower position and an upper position when the hinge and latch pintles extend into the slots. The openings are disposed to permit the gate panel to swing on the hinge pintles and the latch pintles to exit the slots via the openings when the gate panel is raised from a lower position to an upper position whereupon the gate panel can be then dropped at the hinge pintles so as to open the front gate.

11 Claims, 2 Drawing Sheets

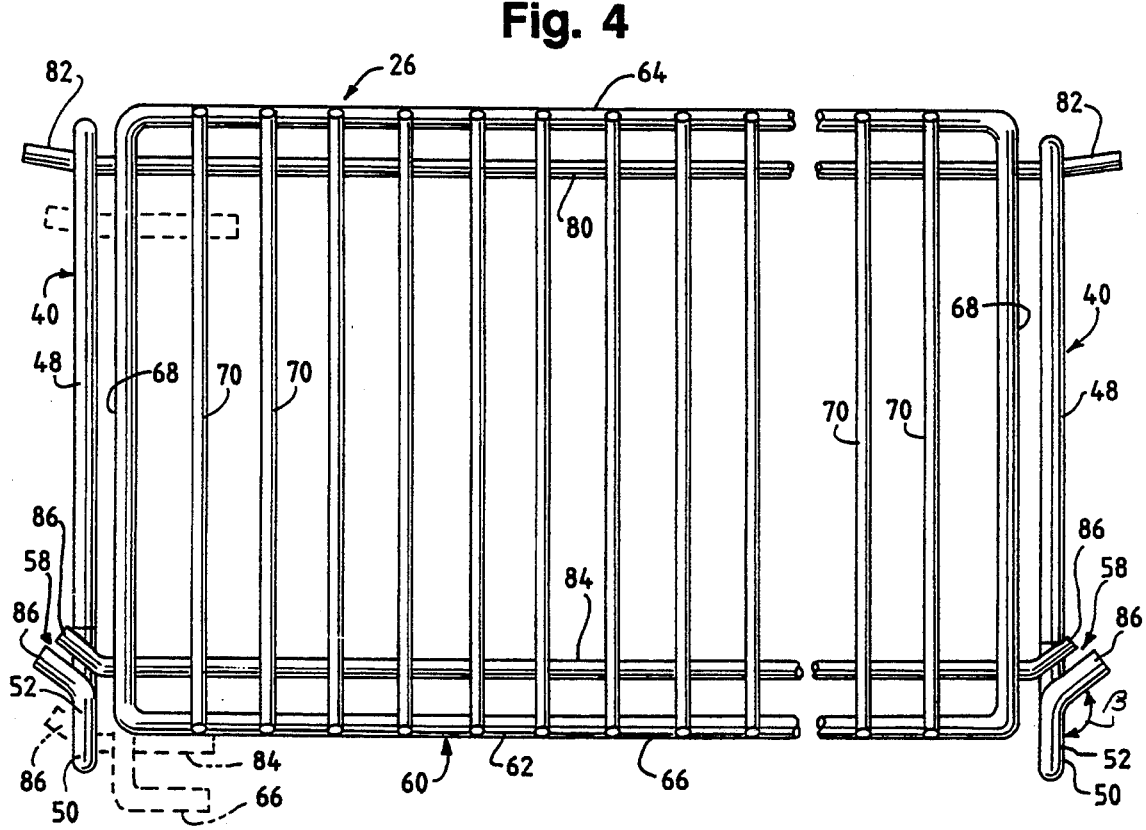
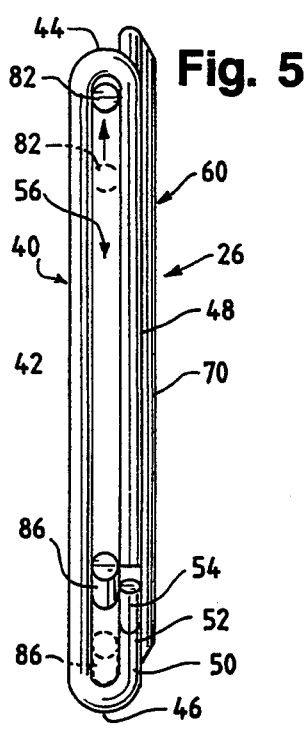
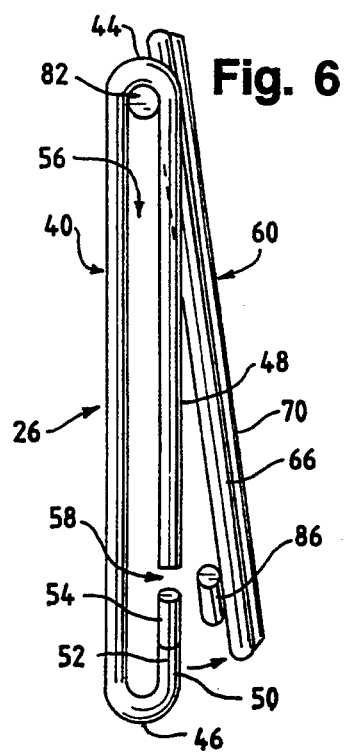
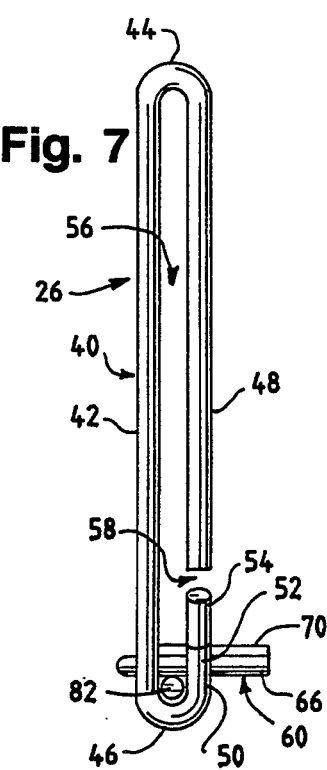

SHOPPING CART HAVING BASKET WITH IMPROVED FRONT GATE

TECHNICAL FIELD OF THE INVENTION

This invention pertains to a shopping cart comprising a basket having a front gate of an improved design. The front gate comprises two stanchions and a gate panel mounted operatively to the stanchions, via upper hinge pintles and lower latch pintles, in a unique arrangement.

BACKGROUND OF THE INVENTION

Shopping carts are in widespread use in supermarkets, hardware stores, and other similar and dissimilar establishments. Generally, a shopping cart has a wheeled chassis, a handle mounted to the chassis, and a wire or plastic basket supported by the chassis. It is known to provide the basket with a front gate, which is openable to facilitate unloading the contents of the basket from the front of the basket.

According to a commonly used design for the front gate, a gate panel made of welded wires and provided with lower hinge pintles and upper latch ears is mounted to the front edges of the side panels so as to permit a checker or a shopper to open the front gate, by raising the gate panel for a sufficient distance to permit the latch ears to clear upper latch fittings on the front edges of the side panels and swinging the gate panel outwardly and downwardly on the hinge pintles. Similarly, a shopper may open the front gate to permit the basket to hold an elongate load, which would not fit into the basket if the front gate were closed.

Although such a gate has proved to be generally satisfactory, it is been found that the gate panel can be inadvertently jostled so as to be upwardly moved for a sufficient distance to permit the latch ears to clear the fittings and the gate panel to swing so that the contents of the basket can spill, particularly when the shopping cart is moved over a curb or along a rough surface.

This invention has resulted from efforts to provide, for a shopping cart, a basket having a front gate that does not open inadvertently when the shopping cart is moved over a curb or along a rough surface.

SUMMARY OF THE INVENTION

This invention provides, in a shopping cart having a basket, a front gate of an improved design for the basket. Broadly, the front gate comprises two stanchions, a gate panel having an upper edge, and means for mounting the gate panel to the stanchions in a unique manner. The gate panel is mounted to the stanchions so as to permit the gate panel to have a limited range of generally vertical movement relative to the stanchions and to swing outwardly and upwardly about an axis near the upper edge when raised to an upper position within that range but not when lowered to a lower position within that range.

Typically, apart from the front gate, such a basket comprises two side panels and a bottom panel, which is fixed to the side panels. The side and bottom panels may be predominantly made from welded wires. Molded plastic panels may be alternatively used.

In one contemplated arrangement, each stanchion is fixed to a front edge of one of the side panels, near a front edge of the bottom panel. Also, each stanchion has an upper end and a lower end and defines an elongate, laterally open, generally vertical slot extending between its upper and lower ends. Further, each stanchion has a front opening, which communicates with the slot defined by such stanchion above, and which is located above the lower end of such stanchion.

In the aforenoted arrangement, the gate panel has two generally horizontal edges and two generally parallel side edges. Also, the gate panel has two hinge pintles and two latch pintles. Each hinge pintle extends laterally beyond one of the side edges into the slot defined by one of the stanchions. Each latch pintle extends laterally beyond one of the side edges and is capable of extending into the slot defined by one of the stanchions.

The hinge pintles are spaced from the latch pintles so as to permit the gate panel to have a limited range of vertical movement relative to the stanchions between a lower position and an upper position when the hinge and latch pintles extend into the slots. The latch pintles rest on the lower ends of the stanchions in the lower position of the gate panel.

The front openings are disposed to permit the gate panel to swing on the hinge pintles and the latch pintles to exit the slots via the front openings when the gate panel is raised from the lower position to the upper position. The gate panel can be then lowered at the hinge pintles until the hinge pintles rest on the lower ends of the stanchions.

In the aforenoted arrangement, each stanchion has a back section, an upper section, a lower section, an upper, front section, and a lower, front section. The back section of each stanchion extends between its upper and lower ends. The upper and lower sections of each stanchion define its upper and lower ends. The front sections are parallel to the back section and define the front opening of such stanchion.

Advantageously, an upper portion of the lower, front section may extend upwardly and laterally at an obtuse angle relative to the lower portion of the same section. Preferably, each latch pintle extends at a similar angle relative to the lower portion of the same section when the hinge and latch pintles extend into the slots. However, the hinge pintles may extend in generally horizontal directions, whereby the upwardly and outwardly portions prevent the hinge pintles from being pulled inadvertently through the front openings.

In a preferred arrangement, each stanchion is formed from a wire, which is bent to form the respective sections of such stanchion. In the preferred embodiment, the gate panel comprises a generally rectangular frame wire defining upper, lower, and side edges of the gate panel, along with multiple wires parallel to the side edges of the gate panel. The parallel wires are welded to the frame wire, near the upper and lower edges of the gate panel. In the preferred embodiment, the hinge and latch wires are provided by two generally horizontal wires extending across the gate panel, laterally beyond the side edges of the gate panel, and being welded to the frame wire.

These and other objects, features, and advantages of this invention are evident from the following description of a preferred embodiment of this invention with reference to the accompanying drawings.

BRIEF DESCRIPTION OF THE DRAWINGS

FIG. 4, on an intermediate scale, is a front elevation of the stanchions and the gate panel. The gate panel is shown fragmentarily in full lines as raised to the upper position and fragmentarily in broken lines as lowered to the lower position.

FIGS. 5, 6, and 7, on the intermediate scale, are side elevations of one of the stanchions and the gate panel. In FIG. 5, the gate panel is shown in full lines as raised to the upper position and in broken lines as lowered to the lower position. In FIG. 6, the gate panel is shown as raised to the upper position and as swung outwardly. In FIG. 7, the gate panel is shown as lowered to the lower position.

DETAILED DESCRIPTION OF PREFERRED EMBODIMENT

Figure 1:
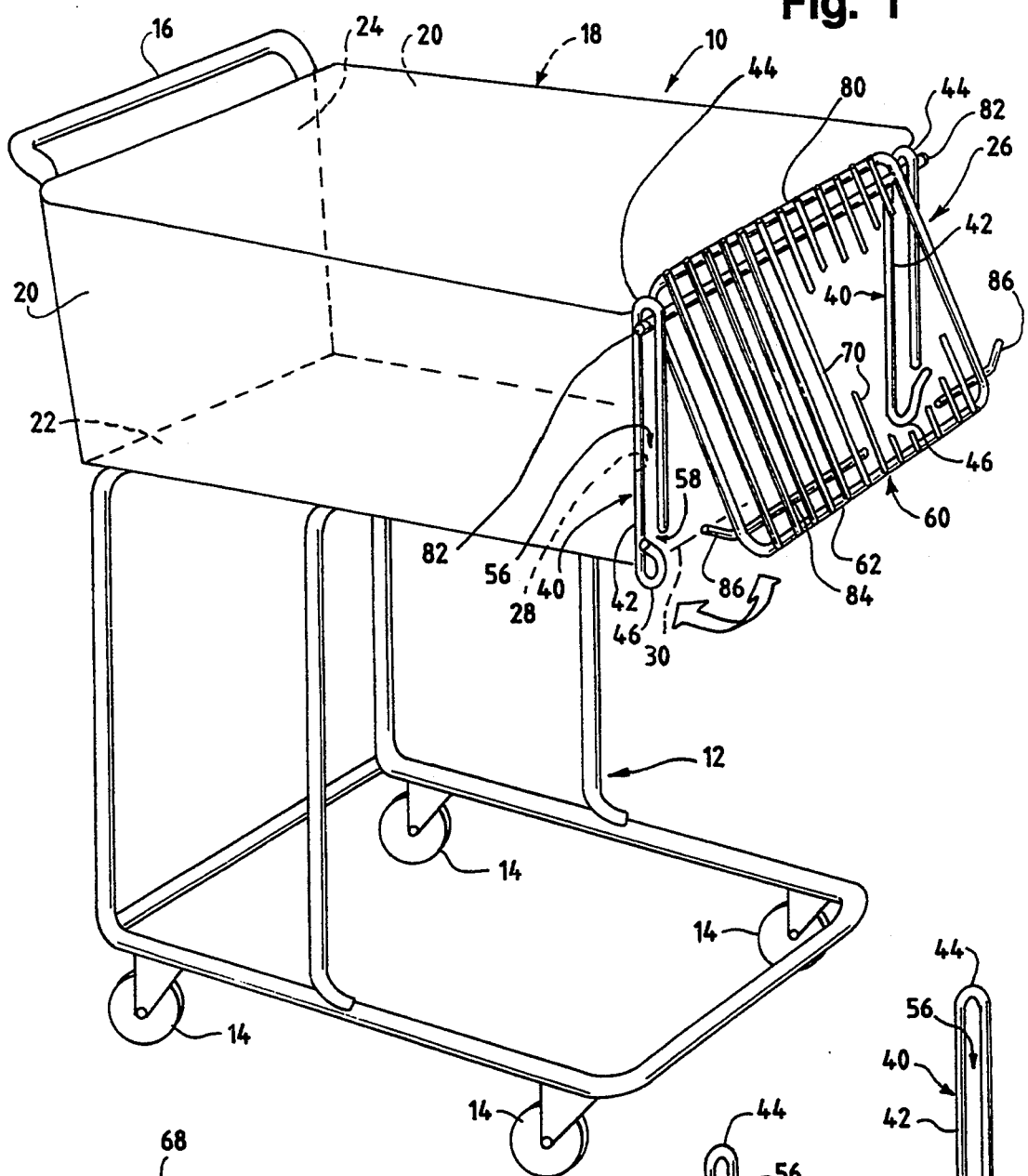
FIG. 1 is a perspective view of a shopping cart including a basket with a front gate embodying this invention and comprising two stanchions and a gate panel. Other features of the basket and other parts of the shopping cart are shown schematically.

As shown in FIG. 1, a shopping cart 10 comprises a wheeled chassis 12, which is provided with four wheeled casters 14 and a rear handle 16, and a wire basket 18, which is supported fixedly on the wheeled chassis 12. The wire basket 18 comprises two side panels 20, a bottom panel 22, a back panel 24, and a front gate 26, which constitutes a preferred embodiment of this invention.

Each side panel 20 has a front edge 28, which is generally vertical. The bottom panel 22 has a front edge 30, which is generally horizontal. The front gate 26 is openable by a checker or a shopper, in a novel way described below, to facilitate unloading of the basket 16.

Preferably, the side and bottom panels 20, 22, may be predominantly made of welded wires in accordance with conventional practice in the art. It is contemplated, however, that molded plastic panels may be alternatively used.

The front gate 26 comprises two stanchions 40, each being formed from a wire fixed, as by welding, to the front edge 28 of one of the side panels 20, near the front edge 30 of the bottom panel 22. The wire forming each stanchion 40 is bent so as to have a back section 42, an upper section 44 forming the upper end of such stanchion 40, a lower section 46 forming the lower end thereof, an upper, front section 48, and a lower, front section 50.

The back section 42 of the wire forming each stanchion 40 extends along the front edge 28 of one of the side panels 20 and is fixed, as by welding, to such edge 28. The upper section 44 of such wire 40 has an inverted U-shaped configuration and extends between the back section 42 thereof and the upper, front section 48 thereof. The lower section 46 of such wire has a U-shaped configuration and extends between the back section 42 thereof and the lower, front section 50 thereof. Preferably, as shown in FIG. 1, the lower section 46 of such wire extends slightly below the bottom panel 22 of the basket 18. The upper, front section 48 of such wire and a lower portion 52 of the lower, front section 50 are parallel to the back section 42 thereof.

Figure 2:
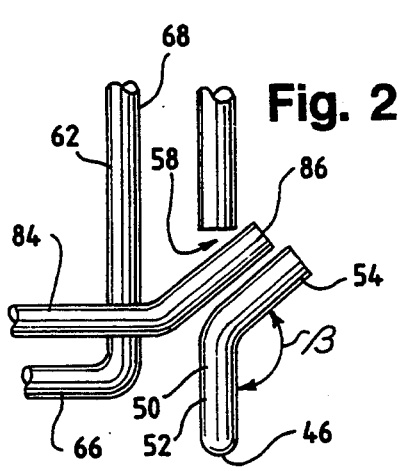
FIG. 2, on an enlarged scale, is a fragmentary, elevational detail showing wire sections defining a front opening of one of the stanchions and a latch pintle extending laterally from one side edge of the gate panel, after the gate panel has been raised to an upper position relative to the stanchions but before the gate panel has been swung outwardly.

As shown in FIGS. 2 and 4, the wire forming each stanchion 40 is bent so that an upper portion 54 of the lower, front section 50 of such wire extends upwardly and laterally at an obtuse angle $\beta$ relative to the lower portion 52 of such section 50.

Each stanchion 40 defines an elongate, laterally open, generally vertical slot 56 between the back section 42 of the wire forming such stanchion 40 and the front sections 48, 50, of such wire. The front sections 48, 50, are spaced from each other so as to define a front opening 58, which communicates with the slot 56.

The front gate 26 comprises a gate panel 60 having a generally rectangular frame wire 62. The frame wire 62 is bent so as to define a generally horizontal upper edge 64 of the gate panel 60, a generally horizontal lower edge 66 thereof, and two generally parallel side edges 68 thereof and is welded end-to-end. The gate panel 60 has multiple wires 70, which are parallel to the side edges 68. The wires 70 are welded to the frame wire 62, near the upper and lower edges 64, 66.

The gate panel 60 has two generally horizontal wires welded to the frame wire 62, near the side edges 68, namely a hinge wire 80 defining a hinge pintle 82 at each end of such wire 80 and a latch wire 84 defining a latch pintle 86 at each end of such wire 84. The hinge wire 80 and the latch wire 84 extend across the gate panel 60.

Each hinge pintle 82 extends beyond one of the side edges 68, in a generally horizontal direction, into the slot 56 defined by one of the stanchions 40. As shown in FIG. 4, the hinge wire 80 may be slightly bent at the hinge pintles 82.

Each latch pintle 86 extends beyond one of the side edges 68 and is capable of extending into the slot 56 defined by one of the stanchions 40. As shown in FIGS. 2 and 4, the latch wire 84 is bent so that each latch pintle 86 is parallel to the upper portion 52 of the lower, front section 50 of the wire forming one of the stanchions 40, when the hinge pintles 82 and the latch pintles 86 extend into the slots 56. Moreover, each latch pintle 86 extends at an angle similar to the aforenoted angle $\beta$ relative to the lower, front section 50 of such wire, when the hinge pintles 82 and the latch pintles 86 extend into the slots 56.

The hinge pintles 82 defined by the hinge wire 80 and the latch pintles 84 defined by the latch wire 82 are spaced from each other so as to permit the gate panel 60 to have a limited range of generally vertical movement relative to the stanchions 40, between an upper position and a lower position, when the hinge pintles 82 and the latch pintles 86 extend into the slots 56. In FIGS. 4 and 5, the gate panel 60 is shown in full lines as raised to its upper position within such range and in broken lines as lowered to its lower position within such range.

The hinge pintles 82 permit the gate panel 60 to swing about an axis near the upper edge 64 of the gate panel 60 when the gate panel 60 is raised to its upper position within the its limited range of generally vertical movement relative to the stanchions 40. The axis is defined by the hinge pintles 82. The latch pintles 86 latch the gate panel 60 releasably to the stanchions 40 so as to prevent the gate panel 60 from swinging on the hinge pintles 82 when the gate panel 60 is lowered to the lower position within such range.

For normal use of the shopping cart 10, the front gate 26 is closed. Thus, the gate panel 60 is disposed in its lower position within the aforenoted range. Also, the latch pintles 84 rest on the lower sections 46 of the wires forming the stanchions 40, below the front openings 58. The hinge pintles 82 continue to extend into the slots 56, between the back sections 42 of the wires forming the stanchions 40 and the upper, front sections 48 of such wires.

The front gate 26 can be easily opened to assist a checker or a shopper in unloading the contents of the basket 18 or to permit the basket to accommodate an elongate load that would not fit into the basket 18 if the front gate 26 were closed.

Figure 3:
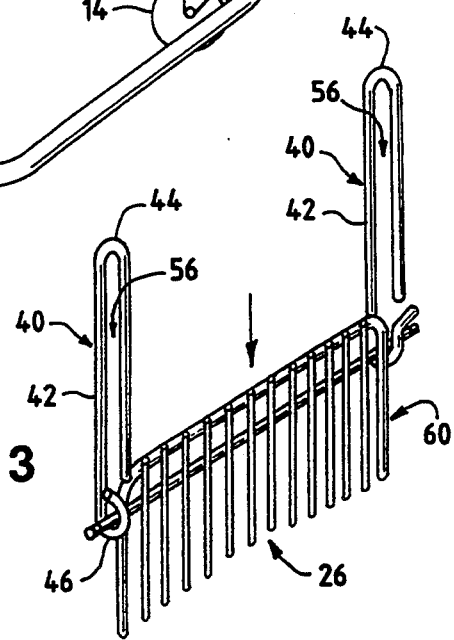
FIG. 3, on the scale of FIG. 1, is a perspective detail showing the gate panel as lowered to a lowered position relative to the stanchions.

The front openings 58 are disposed to permit the gate panel 60 to swing on the hinge pintles 82 and the latch pintles 84 to exit the slots 56 via the front openings 58, as shown in FIGS. 1 and 6, when the gate panel 60 is raised from its upper position to its lower position. The gate panel 60 can be then lowered at the hinge pintles 82 until the hinge pintles 82 rest on the lower sections 46 of the wires forming the stanchions 40, below the front openings 58. The gate panel 60 may be then permitted to drop downwardly, as shown in FIG. 3, or swung forwardly, as shown in FIG. 7, or backwardly under the bottom panel 22 of the basket 18 so as to permit the basket 28 to overlie a checkout counter (not shown) from the front of the basket 18.

Furthermore, the gate panel 60 can be easily replaced so that the latch pintles 86 extend into the slots 58 and rest on the lower sections 46 of the wires forming the stanchions 40, for normal use of the shopping cart 10.

Because the hinge pintles 82 extend in substantially horizontal directions, the upwardly and laterally extending portions 54 of the wires forming the stanchions 40 prevent the hinge pintles 82 from being pulled inadvertently through the front openings 58 as the gate panel 60 is being moved.

The front gate 26 can be effectively used on an over-the-counter shopping cart (not shown) which is a shopping cart of a known type having a chassis configured to support a basket in a cantilevered manner and to permit the basket to overlie a checkout counter from one side of such basket. Thus, except for the front gate 26 of the wire basket 16, the shopping cart 10 may conform to the shopping cart illustrated and described in Stover et al. U.S. Pat. No. Re. 32,453, the disclosure of which is incorporated herein by reference. Also, where the back panel 24 is shown, the wire basket 18 may comprise a baby seat (not shown) as illustrated and described in the aforenoted patent.

Various other modifications may be made in the preferred embodiment described above without departing from the scope and spirit of this invention.

I claim:

1. A shopping cart basket having a front gate, the front gate comprising two stanchions, a gate panel having an upper edge, and means for mounting the gate panel to the stanchions so as to permit the gate panel to have a limited range of generally vertical movement relative to the stanchions and to swing outwardly and upwardly about an axis near the upper edge when raised to an upper position in said range but not when lowered to a lower position in said range.

2. For a shopping cart basket, a front gate comprising two stanchions, a gate panel having an upper edge, and means for mounting the gate panel to the stanchions so as to permit the gate panel to have a limited range of generally vertical movement relative to the stanchions and to swing outwardly and upwardly about an axis near the upper edge when raised to an upper position in said range but not when lowered to a lower position in said range, wherein the mounting means include hinging means, which hinge the gate panel to the stanchions so as to permit the gate panel to swing outwardly and upwardly when raised to the upper position within said range, and latching means, which latch the gate panel releasably to the stanchions so as to prevent the gate panel from swinging on the hinging means when the gate panel is lowered to the lower position within said range.

3. The front gate of claim 2 wherein the hinging means are located above the latching means when the gate panel is in the upper or lower position within said range.

4. A shopping cart comprising a basket, which includes two side panels and a bottom panel fixed to the side panels and having a front end, each side panel having a generally vertical front edge and the bottom panel having a generally horizontal front edge, and which includes a front gate comprising two stanchions, each stanchion being fixed to the front edge of one of the side panels, near the front edge of the bottom panel, each stanchion having an upper end and a lower end and defining an elongate, laterally open, generally vertical slot extending between the upper and lower ends of such stanchion, the front gate further comprising a gate panel having two generally horizontal edges and two generally parallel side edges, the gate panel having a pair of upper hinge pintles, each of which extends laterally beyond one of the side edges into the slot defined by one of the stanchions, the gate panel having a pair of lower latch pintles, each of which extends laterally beyond one of the side edges and is capable of extending into the slot defined by one of the stanchions, the hinge pintles being spaced from the latch pintles so as to permit the gate panel to have a limited range of vertical movement relative to the stanchions between a lower position and an upper position when the hinge and latch pintles extend into the slots, the latch pintles resting on the lower ends of the stanchions in the lower position of the gate panel, each stanchion having a front opening communicating with the slot defined by such stanchion above the lower end of such stanchion, the front openings being disposed to permit the gate panel to swing on the hinge pintles and the latch pintles to exit the slots via the front openings when the gate panel is raised from the lower position to the upper position whereupon the gate panel can be then lowered at the hinge pintles until the hinge pintles rest on the lower edges of the stanchions.

5. The shopping cart of claim 4 wherein each stanchion has a back section extending between the upper and lower ends of such stanchion, an upper section defining the upper end of such stanchion, a lower section defining the lower end of such stanchion, an upper, front section parallel to the back section, and a lower, front section having a lower portion parallel to the back section, the front sections defining the front opening of such stanchion, the lower, front section having an upper portion extending upwardly and laterally at an obtuse angle relative to the lower portion of the lower, front section.

6. The shopping cart of claim 5 wherein the latch pintles are defined by a bent wire.

7. The shopping cart of claim 6 wherein the latch pintle capable of extending through the slot defined by each stanchion extends at a similar angle relative to the lower portion of the lower, front section of such stanchion when the hinge and latch pintles extend into the slots.

8. The shopping cart of claim 7 wherein the hinge pintles extend in generally horizontal directions, the upwardly and outwardly extending portions of the lower, front sections of the stanchions preventing the hinge pintles from being pulled inadvertently through the front openings.

9. The shopping cart of claim 6 wherein each stanchion comprises a wire bent to form the back, end, and front sections of such stanchion.

10. The shopping cart of claim 9 wherein the hinge and latch pintles are provided by two generally horizontal wires extending across the gate panel and laterally beyond the side edges of the gate panel.

11. The shopping cart of claim 9 wherein the gate panel comprises a generally rectangular frame wire defining upper, lower, and side edges of the gate panel, the gate panel further comprising multiple wires parallel to the side edges of the gate panel and welded to the frame wire and two generally horizontal wires extending across the gate panel and welded to the frame wire, near the upper and lower edges of the gate panel, the generally horizontal wires extending laterally beyond the side edges of the gate panel and defining the hinge and latch pintles.

* * * * *